United States Patent [19]

Marino

[11] 3,909,629

[45] Sept. 30, 1975

[54] H-CONFIGURED INTEGRATION CIRCUITS WITH PARTICULAR SQUELCH CIRCUIT

[75] Inventor: Peter T. Marino, Boulder, Colo.

[73] Assignee: International Business Machines Corporation, Armonk, N.Y.

[22] Filed: Sept. 30, 1974

[21] Appl. No.: 510,322

Related U.S. Application Data

[62] Division of Ser. No. 435,802, Jan. 23, 1974.

[52] U.S. Cl. .................. 307/229; 307/232; 329/50; 360/40

[51] Int. Cl.[2]. G06G 7/12; H03D 13/00; G11B 5/09

[58] Field of Search ............ 307/229, 232; 328/127, 328/151, 133; 329/50; 360/40

[56] References Cited

UNITED STATES PATENTS

| | | | |
|---|---|---|---|
| 3,217,183 | 11/1965 | Thompson | 307/232 |
| 3,529,177 | 9/1970 | Pawletko | 307/229 |
| 3,548,327 | 12/1970 | Vermeulen | 307/232 |
| 3,789,207 | 1/1974 | Jones | 328/151 |
| 3,818,501 | 6/1974 | Fiorino | 360/40 |

*Primary Examiner*—Stanley D. Miller, Jr.
*Attorney, Agent, or Firm*—Herbert F. Somermeyer

[57] ABSTRACT

Alternately cycled integrators alternately and successively drive first and second demodulator output circuits to supply data signals to first and second detecting latches, respectively, to convert received periodic digital signals to detected timed data signals. For high-frequency operation, the alternately cycled integrators are squelched in successive alternate time periods after a short predetermined squelch delay. The delay enables reliable sampling of the integrated signal amplitudes.

7 Claims, 4 Drawing Figures

H-CONFIGURED INTEGRATION CIRCUITS WITH PARTICULAR SQUELCH CIRCUIT

This is a division, of application Ser. No. 435,802 filed Jan. 23, 1974.

RELATED PATENTS AND APPLICATIONS

This application is an improvement over co-pending, commonly assigned application, Ser. No. 353,823, filed Apr. 23, 1973 now U.S. Pat. No. 3,818,501.

Thompson U.S. Pat. No. 3,217,183 and Vermeulen U.S. Pat. No. 3,548,327 disclose integration data bit detection apparatus.

BACKGROUND OF THE INVENTION

The present invention relates to detecting data from signals represented in diverse waveforms, particularly those waveforms associatable with magnetic recording and communication systems.

Detection of data represented by multidistinct state signals, by using integration techniques, provides noise immunity advantages, as well as sensitivity enhancement over detection schemes analyzing wavelengths. In a binary recording or communication system, the binary signal is limited to two distinct states for representing 1's or 0's. Such a representation is called "nonreturn to zero" (NRZ). An improved data representation scheme is so-called "NRZI" (nonreturn to zero, change on 1 and no change on 0). Other data manifestations using multidistinct state signals include phase-encoded (PE), double-frequency (DFE or FM), etc.

As data rates increase, there is a corresponding increase in the frequency components of the signal being detected, as well as a substantial decrease in the time a data detector has to reliably extract represented data signals from an incoming or received signal. As such data bit period decreases in duration, the detection period for such data also decreases; hence, for a given squelch or recovery time in an integration system, the percentage of the detection period used for squelching increases. Accordingly, it is highly desirable to use alternate cycle integration as set forth in the above-referenced co-pending application. However, at higher frequencies, because of the squelching at the end of each detection period, certain errors can occur if the squelch is applied to the integrated waveform prematurely as by different circuit delays. The sampling of the integrated value is delayed somewhat beyond the end of the detection period. Therefore, it is highly desirable that integration data detection systems be devised which obviate the squelch problem even inherent in alternate cycled integration.

Further, processing of the sampled integration signal requires extremely rapid logic and detection circuits. Accordingly, it is desired to maximize the frequency throughput of a detection apparatus while maintaining frequency requirements on the detecting and signal processing logic at a reasonable level.

SUMMARY OF THE INVENTION

It is an object of the present invention to provide an improved data detection scheme used with higher frequency digital data systems which enable usage of moderate frequency circuitry.

In accordance with the present invention, a signal processing apparatus has first and second signal processing channels which alternately and successively process a signal. Each of the signal processing channels includes a synchronous demodulator circuit, preferably in the form of an alternate cycle integrator (no limitation thereto intended).

In accordance with another aspect of the present invention, sampling errors of the integrated values are minimized by delaying the squelch a relatively short period of time after the end of each detection period. The binary representation of the detected integrated value is maintained in one of the two aove-mentioned memory circuits for use during a subsequent detection period. The latter arrangement is particularly useful in the detection of NRZI signals.

In a most preferred form of the invention, such squelch delay is provided by delaying the application of squelch to the alternate cycle integrators by the storage time of saturated transistor elements. Such squelch delay is preferably of a duration just slightly greater than that minimum time required for sampling an integrated value. In a present constructed form of the invention, the delay does not exceed 15 nanoseconds for a detection period of approximately 70–75 nanoseconds.

The foregoing and other objects, features, and advantages of the invention will become apparent from the following more particular description of the preferred embodiment, as illustrated in the accompanying drawing.

THE DRAWING

DETAILED DESCRIPTION

Figure 1:
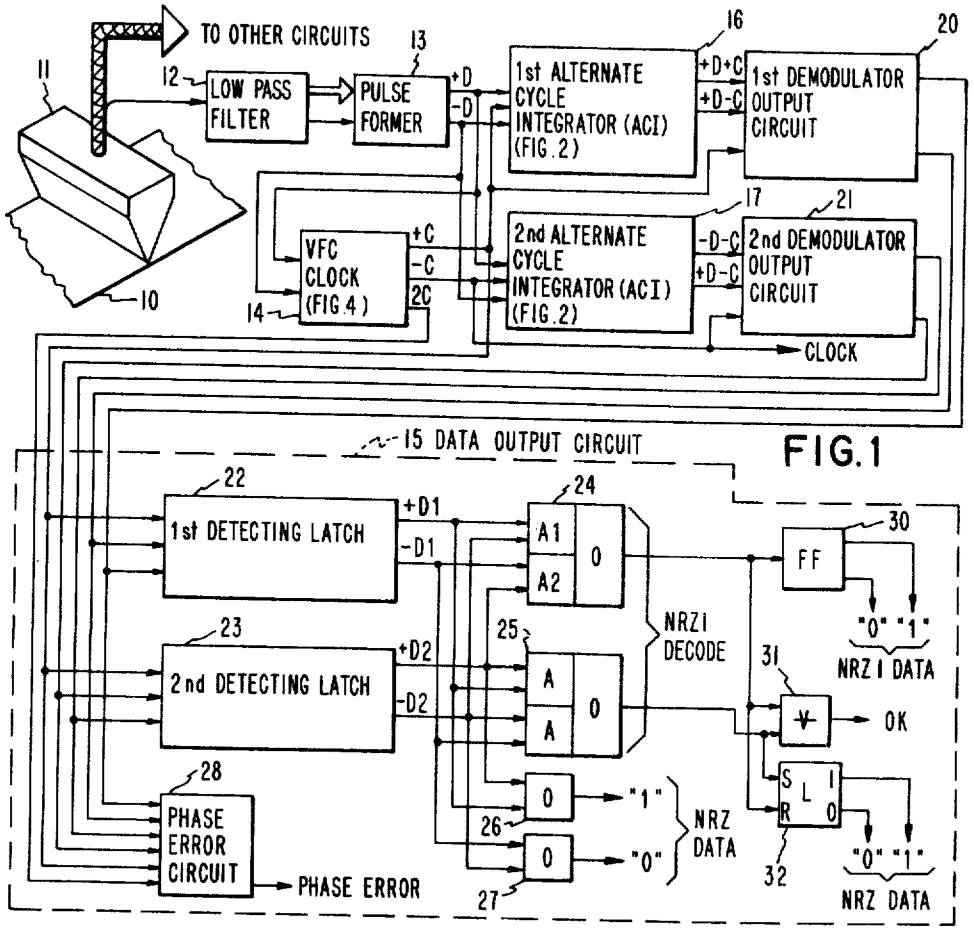
FIG. 1 is a simplified block diagram of an apparatus employing the present invention.

Referring now more particularly to the appended drawing, like numerals indicate like parts and structural features in the various diagrams. The term "transistor elements" or "semiconductive elements" includes transistors each having a control portion (base-to-emitter junction and two output portions, the collector and emitter regions. In the drawing symbols, such as for transistor element 75, C denotes collector region, E denotes emitter region, and B denotes the base-to-emitter junction. Symbols for all the other denoted transistor elements are identically represented in the drawing.

The present invention is particularly advantageously employed in the readback of digital signals from a magnetic medium 10 for supplying detected data signals to synchronously operated circuits, as is well known in the recording arts. A magnetic head 11 scans tracks on medium 10 to supply readback signals to low-pass filter 12, as well as other circuits or channels (not shown). In a multitrack environment, such as operation with a ½ inch magnetic tape medium, there can be nine circuits as shown in FIG. 1, one for each of the record tracks.

Figure 3:
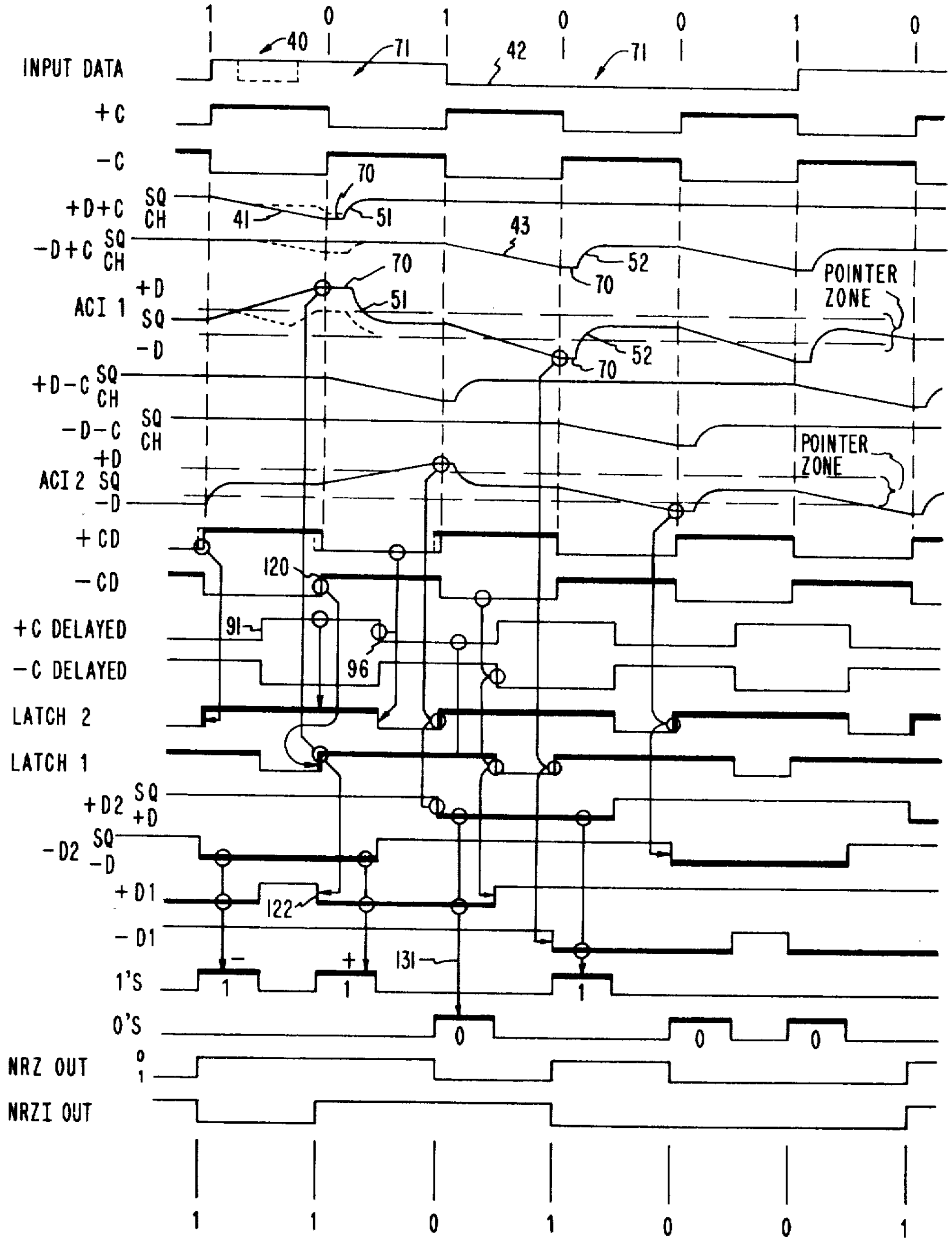
FIG. 3 is a set of signal waveforms used to illustrate the operation of the FIGS. 1 and 2 illustrated apparatus, both for data detection and phase error detection.

Low-pass filter 12 accentuates the low-frequency portion of the readback signal for enhancing data detection. In one constructed embodiment with which the present invention was employed, the bandpass of the readback signals was desired to be 3:1. Hence, the low-pass filter was designed to pass such a band from the baseband recorded signals on medium 10. The low-pass filter 12 also includes a phase splitter such that the readback signals are supplied in differential form to pulse former 13. The pulse former, in turn, differentially supplies amplitude limited input data signals hereinafter termed "+D and −D" signals. Such +D input data signals are shown in FIG. 3 as input data in the NRZI information representation. The −D signals have opposite polarity to the +D signals.

Figure 4:
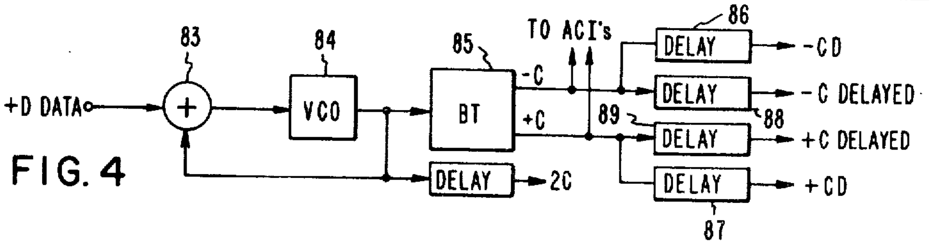
FIG. 4 is a simplified diagram of a clocking system usable with the FIG. 2 illustrated circuits.

Pulse former 13 supplies the +D and −D amplitude limited data signals to synchronize VFC (variable frequency clock) 14, such as well known in the art and as shown in simplified detail in FIG. 4. VFC 14 differentially supplies +C and −C timing or clock signals for enabling synchronous demodulation of the +D and −D data signals for supplying timed and detected signals from data output circuit 15.

The +D and −D amplitude limited data signals are supplied to both first and second alternate cycled integrators (ACI) 16 and 17. These two circuits are synchronous demodulators, respectively in first and second signal processing channels which are alternately and successively actuated to detect data signals, respectively, by the +C and −C timing signals. The first data channel operates during a first set of detection periods represented in FIG. 3 by +C signal positive portions, while the second data channel operates on the input data signal during alternate successive periods identified by the positive portions of the −C clock signal. Such detection periods do not necessarily coincide with bit periods. In the illustrated input data signal, a bit period is between the carets intermediate the indicated data; while the detection periods are between bit period centers or cell centers on the record medium. The advantage of employing the present invention using detection periods shifted by 180° from the bit period will become apparent.

Each synchronous demodulator 16 and 17 supplies, respectively, +D+C, −D+C, and −D−C, +D−C integrated signals, respectively, to first and second demodulator output circuits 20 and 21. Circuits 20 and 21, respectively, compare under timing control of VFC 14, the integrated signals to indicate the integrated values, respectively, to first and second detecting latch circuits 22 and 23. Again, signals from VFC 14 time the operation of the first and second detecting latch circuits 22 and 23 such that the output signals of these latches represent both detected data with the VFC timing information. When NRZI signals are being detected, a pair of AO's 24 and 25 converts the +D1, −D1, +D2, and −D2 signals from the latches 22 and 23 into NRZI data, as will be more fully described later. If NRZ data is being detected (for example, PE data that has been initially demodulated from PE to NRZ form), a pair of OR circuits 26 and 27 combines the latch output signals to reconstitute NRZ data. Additionally, phase error circuit 28 responds to signals from both channels to indicate a phase error or phase okay to be used as taught by Hinz, Jr., in U.S. Pat. No. 3,639,900.

Data output circuit 15 includes binary trigger circuit 30 responsive to the 1 NRZI timed data signals from AO 24 to regenerate the NRZI data, as will be more fully described later. Additionally, Exclusive-OR circuit 31 responds to the output signals of AO 24 and AO 25 to indicate that the circuit is operating okay. That is, for any given detection period, there has to be either an NRZI 1 or an NRZI 0. Exclusive-OR 31 ensures that such detection has occurred even though the NRZI 0's are not used for data reconstruction.

Figure 2:
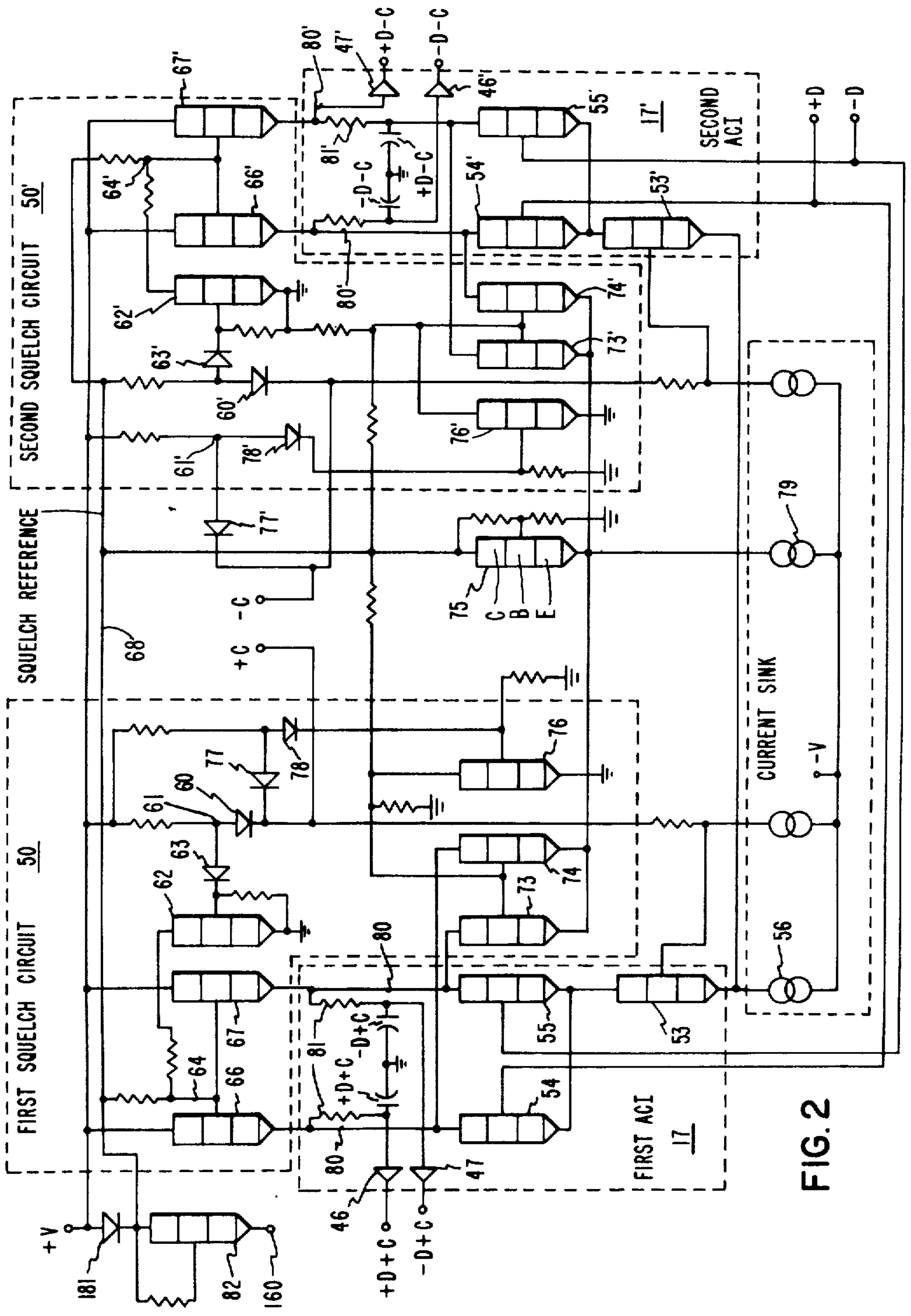
FIG. 2 is a circuit diagram showing the alternate cycle integrators used in the FIG. 1 illustrated embodiment and particularly illustrating squelch delay aspects of the present invention.

Referring next to FIG. 2, operation of the ACI's and squelch circuits is described in detail with reference to FIG. 3. ACI's for both channels 1 and 2 are identically constructed, as are the squelch circuits. In the description, the number primed applied to the second channel in the same manner as described for the first channel. The first ACI 16 has two integration capacitors respectively labeled +D+C and −D+C. The +D+C capacitor integrates plus data during + clock times. Referring to FIG. 3, + clock when positive and when the +D input data is positive as at 40 causes the +D+C capacitor to be negatively charged as at 41. When +C is positive, and −D is positive, the −D+C capacitor is similarly negatively charged. When +D is negative, as at 42, and charged as at 43, the differential integrated value of the first ACI taken between integration signal terminals 44 and 45 is shown in the signal waveform labeled ACI 1. Second ACI 17 operates in a similar manner for +D−C and −D−C capacitors. The integrated values in the respective capacitors are supplied through isolating amplifiers 46 and 47 to the demodulator output circuits.

First squelch circuit 50 squelches the capacitors in first ACI in those bit periods when the second ACI is integrating signals. For example, in the +D+C signal waveform, the squelch is at 51 for the integrated value 41. In a similar manner, squelch at 52 squelches −D+C capacitor as integrated at 43. Squelch waveforms are also shown in the ACI 1 signal. The ACI 2 signal shows operation of ACI 17'.

The first ACI integrates data negatively whenever +C is positive. +C going positive disables squelch circuit 50. When +C is positive, current selector switch transistor element 53 connects the integrating transistors 54 and 55 to current source 56. When +C is negative, element 53 is current nonconductive to disconnect the ACI 17 from source 56. During alternate cycles, the −C clock enables transistor element 53' of the second ACI 17 such that current source 56 supplies integrating current for both ACI's in an alternate successive manner.

Transistor element 54 switches to current conduction by +D being positive. Transistor element 55 switches to current conduction in response to −D being positive, the latter corresponding to +D being negative. Hence, current source 56 supplies the integration current for both capacitors +D+C and −D+C in accordance with the synchronous relationship between the data signal and the VFC 14 supplied clock signal +C.

As +C goes negative, the squelch circuit 50, after a short squelch delay, rapidly returns the negatively charged value of +D+C and −D+C capacitors to a positive squelch reference potential as indicated by lines 51 and 52 of FIG. 3. When +C goes negative, transistor 53 becomes current nonconductive; hence, transistors 54 and 55 become inactive to hold the charge on the capacitors in the first ACI. +C being negative causes diode 60 to conduct current, thereby making node 61 relatively negative. This makes delay transistor 62 current nonconductive; that is, the circuit arrangement surrounding transistor element 62 delays the squelching of capacitors +D+C and −D+C by its saturation time. When +C was positive, node 61 correspondingly was positive. Thence, the positive voltage being fed through diode 63 makes transistor 62 current conductive to saturation. Such current conduction makes node 64 relatively negative. Node 64 being relatively negative makes the two matched squelch transistors 66 and 67 current nonconductive, hence, isolating squelch reference at node 68 from the two integration capacitors.

The term "matched transistor elements," as used in this specification, means that the electrical characteristics of such elements are almost identical. This is most advantageously achieved by simultaneously diffusing impurities for the transistor elements in the same area on a monolithic semiconductive chip such that the diffusions and the characteristics of the chip are as close as possible together. The entire FIG. 2 illustrated circuit can be achieved on one semiconductive chip, except for the capacitors, with matched transistors being located close together for achieving matching electrical characteristics.

Returning now to the operation of squelch collector circuit 50, transistor 62 being in current saturation cannot completely turn off until a predetermined time after +C has gone negative. The minority carriers in transistor element 62 continue to make node 64 relatively negative for a period of time equal to 5–15 nanoseconds. During this period of time, transistor 53 has switched off, resulting in a held voltage in ACI 1 signal as at 70. This squelch delay extends into the squelch period as at 71 following each detection period 40 and 42, for example. This action enables the ACI 17 to be sampled without being affected by the squelch circuit 50. The above-described circuit using high-speed current switches in an advantageous "H" arrangement to provide an optimum alternately cycled integration arrangement.

The current sink portion of squelch circuit 50 includes current-switch transistor elements 73 and 74. Transistor element 76 controls the current conduction of elements 73, 74, and 75, plus 76', 73' and 74'. Also, transistor 76 is switched into and out of operation by diodes 77 and 78 in the same manner as diodes 60 and 63 control transistor 62. Transistor 76, during the integration (detection) period, is in current saturation and, therefore, affords the same delay as transistor 62. Hence, during the squelch time, transistors 73 and 74 respectively connect the capacitor nodes 80 to current sink transistor 79 for supplying sufficient current for squelch level matching by transistors 66 and 67. Transistor 75 supplies current to sink 79 only when all transistor elements 73, 74, 73' and 74' are current nonconductive, i.e., during each and every squelch delay. Hence, transistor elements 73, 74, plus 75 and 73', 74' constitute a three-way current switch for switching sink 79 between two circuits having delayed current switching (squelch) delays.

The positive squelch reference potential is determined by transistors 66 and 67 via common diode 181 connected to the collector source potential. The squelch reference on node 68 is applied to both ACI's 17 and 17'. In addition, diode-connected transistor 82 supplies the squelch reference potential to the phase error circuit 28 as a phase shift reference.

Squelch circuit 50 squelches integration capacitors +D+C, −D+C in a capacitive emitter-follower circuit configuration. To damp any oscillations, each capacitor has its signal terminal respectively connected to the corresponding squelch-integrate nodes 80 via a damping resistor 81. The integrated signals in capacitors +D+C and −D+C are sensed by high-input impedance amplifiers or level shifters 46 and 47.

Referring next to FIG. 4, the VFC arrangement is shown in simplified form. Data received from the pulse former 13 can be either +D or −D. In FIG. 4 apparatus, +D is summed in summer 83 with the output of VFO 84 to control the frequency of operation thereof in a known manner. VCO 84 drives frequency dividing binary trigger (BT) 85 to produce the +C and −C clock signals, as shown in FIG. 3. BT 85 is a conventional binary trigger. In addition, four delay circuits delay the +C and −C signal.

A 7–15 nanosecond delay is applied to the clock signals by circuits 86 and 87 to produce the ±CD signals. The ±C delayed are generated by delay circuits 88 and 89 for enabling NRZ-to-NRZI data conversion while using the detector latches thereby avoiding additonal memory circuits in the detection apparatus. The 2C signal is twice the C pulse repetitive frequency but phase delayed a small amount.

A detector latch 22, 23, such as that employed in the present application, is first described by Gene Clapper in the IBM TECHNICAL DISCLOSURE BULLETIN, February 1964, on Page 69.

Referring back now to FIG. 1, the output signals of the first and second detecting latches 22 and 23 drive the NRZI decode AO's 24 and 25. NRZI 1 is represented by a change in signal polarity. To this end, the +D1 and −D2 signals drive the A1 portion of AO 24 to indicate an NRZI 1; while the −D1 and +D2 output signals drive the A2 portion to indicate an opposite change in signal polarity for an NRZI 1. IN a similar manner, like polarity output signals −D1 and +D2, and −D1 and −D2, respectively drive the two AND input portions of AO 25 for indicating NRZI 0's, i.e., no change in readback signal polarity. Such signal detection is illustrated in FIG. 3 by the action line 130 tieing −D2 to +D1 to indicate a binary 1 output pulse; while a binary 0 is indicated by action line 131 tieing +D2 with +D1 to indicate an NRZI 0. The 1's and 0's are combined to generate the NRZI output signal in trigger 30. NRZ output signal from an NRZ input signal is generated by the OR's 26 and 27, as can be determined by examination of FIG. 1. An NRZ output signal from an NRZI input signal is supplied via set-reset latch 32.

While the invention has been particularly shown and described with reference to a preferred embodiment thereof, it will be understood by those skilled in the art that various changes in form and detail may be made therein without departing from the spirit and scope of the invention.

What is claimed is:

1. An integration circuit including in combination:

a capacitor element for containing an integrated signal and having a reference terminal and a signal terminal, means for supplying an integrating signal to said capacitor element at said signal terminal, a squelch sink semiconductive element having an electrical connection to said signal terminal and having a control portion, a squelch source semiconductor element having an output portion electrically connected to said signal terminal, a power receiving terminal and a control portion, squelch reference means having a given internal impedance and electrically connected to both said control portions of said squelch source and sink semiconductor elements for applying a squelch reference current thereto, independent semiconductor means electrically respectively connected to said control portions and being normally current conductive at collector current saturation for diverting all of said squelch current from said control portions and exhibiting a saturation time delay in switching from collector current saturation conduction to nonconduction, and timing control means electrically connected to said integrating signal supply means and to both said independent semiconductor means for actuating said integrating signal supply means and said independent semiconductor means alternately and successively such that at a completion of an integration period said independent semiconductor means delay application of said squelch reference current to said squelch semiconductor elements for permitting sensing any integrated signal in said capacitor element.

2. An H-configured integration circuit having first and second integration capacitor elements, each with a signal terminal, the improvement comprising:

first and second integration semiconductive elements, each element having collector and emitter portions, said collector portions being respectively ohmically connected to said signal terminals of said first and second integration capacitor elements and each said element having data input control portions for receiving input data signals to be integrated;

first and second current source squelching semiconductive elements having commonly connected timing input control portions, having emitter output portions respectively connected to said signal terminals of said first and second integration capacitor elements and having commonly connected collector output portions;

first and second current sink squelching semiconductive elements having collector portions respectively connected to said signal terminals of said first and second integration capacitor elements, having commonly connected timing input control portions and having commonly connected emitter portions;

timing means including first and second timing semiconductive elements respectively connected to said timing input control portions and a third timing semiconductive element having a collector portion connected to both said emitter portions of said integration semiconductive elements, means for alternatively and successively actuating said first and second timing semiconductive elements and between collector current nonconduction and collector saturation current conduction and said third timing semiconductive element between collector saturation current conduction and collector current nonconduction synchronously with said first and second timing semiconductive elements to alternately actuate said integration semiconductive elements and said squelching semiconductive elements to current conduction including delaying squelch after each integration a period of time not exceeding a given saturation time of said first timing semiconductive element;

a pair of current sinks respectively connected to said second and third timing semiconductive elements;

voltage source means;

said first and second current source squelching semiconductive elements collector portions being connected to said voltage means;

squelch reference control means connected to said voltage source means and having an output terminal, said output terminal being connected to said timing input control portions of said current source squelching semiconductive elements for supplying a squelch reference thereto; and said first and second timing semiconductive elements having collector portions respectively connected to said timing input control portions of said first and second current source squelching semiconductive elements and said first and second current sink semiconductive element, said timing means simultaneously turning off said first and second timing semiconductive elements at the conclusion of each said integration periods such that said current squelch reference is applied to said first and second current source squelching semiconductive elements one saturation time of said first timing semiconductive element after said timing means turns off said first timing semiconductive element and said current sink semiconductive elements become current conductive one saturation time of said second timing semiconductive element after said timing means turns off said second timing semiconductive elements.

3. A plural integrator apparatus, including in combination:

a first capacitor in each of said integrators and each capacitor having one terminal at a reference potential and a signal terminal, an integration semiconductive element in each of said integrators and having a collector portion connected to said signal terminals, respectively, and each having a control portion for receiving signals to be integrated and each having an emitter portion, timing control means including separate timing semiconductive elements for each of said integrators and said timing semiconductive elements having collector portions respectively connected to said emitter portions of said integration semiconductive elements, each having a control portion and having an emitter portion commonly connected to said emitter portions of other ones of said timing semiconductive elements, a current source connected to said timing semiconductor element emitter portions, a squelch source transistor element in each said integrator and each having an emitter portion ohmically connected to the respective said signal terminals and each having a collector portion commonly connected with all other squelch source semiconductive element collector portions and a timing input control portion, said timing means further including for each said integrator a separate timing delay transistor element in a normally current conductive mode, exhibiting a given saturation time and each having a control portion and each having a collector portion connected to said control portion of said squelch source transistor element in said respective each integrator, said timing means having control means connected to said control portions of said timing elements for successively actuating said timing delay transistor elements to current nonconduction and synchronously actuating respective ones of said timing semiconductive elements to current nonconductive such that saturation time of each said timing delay semiconductive element delays the squelch of the capacitor element of said respective integrator one said given saturation time, squelch reference means connected in common to all of said control portions of said squelch source semiconductive elements, a resistive element electrically interposed between each of said control portions of said squelch source semiconductive elements and said squelch reference, a squelch sink semiconductive element for each of said integrators and each having a collector portion connected to said signal terminal in the respective integrators, having a control portion electrically connected to said control means said timing means in parallel circuit to said timing delay semiconductive elements in the respective integrators for switching said squelch sink transistor elements to current conduction whenever said integrators are not integrating and further having an emitter portion commonly connected to all emitter portions of said squelch sink semiconductive elements, a current source connected to said commonly connected emitter portions of said squelch sink transistor elements, and diode means connected between said squelch reference and said commonly connected emitter portions of said squelch sink transistor elements.

4. The circuit set forth in claim 3 further including:

a given reference potential means and supply potential means, said supply potential means connected to said collector portions of said squelch source semiconductive elements, and a separate resistive element electrically connecting said squelch reference means to each said control portions of each of said squelch sink semiconductive elements, said timing means including diode clamping means for selectively controlling the application of a squelch reference to said squelch sink semiconductive elements, an additional diode-type semiconductive element electrically interposed between said control portions of each of said squelch sink semiconductive elements, respectively, and said given reference potential means and each being responsive to said timing means for clamping a potential on said control portions of said squelch sink semiconductive elements to said given reference potential means for making said squelch sink semiconductive elements respectively nonconductive whenever the respective integrators are integrating.

5. The circuit set forth in claim 4 further including:

a second capacitor in each of said plurality of integrators and each having a second signal terminal for receiving second data signals to be integrated, second squelch source transistor elements each having an emitter portion electrically connected to said second terminals respectively, and a control portion electrically connected to said control portion of the first mentioned squelch source transistor elements, respectively, and a collector portion connected to said supply potential means, second integrating semiconductive elements in each of said integrators each having a collector portion electrically connected to said second signal terminals, respectively, each having a control portion for receiving a data signal and a commonly electrically connected emitter portion connected respectively to the first mentioned integrating semiconductive elements in the respective integrators and further electrically connected to the respective collector portions of said timing semiconductive elements, and second squelch sink semiconductive element for each of said plurality of integrators and each having a collector portion connected respectively to said second signal terminal, a control portion respectively connected to the control portion of the first mentioned squelch sink semiconductive elements respectively and each having an emitter portion electrically connected to all emitter portions of said squelch sink semiconductive elements.

6. The circuit set forth in claim 5 further including separate differential output means connected across each of said first and second signal terminals in each said integrators.

7. The integrator circuit set forth in claim 6 wherein said timing control means includes a separate first diode having a cathode respectively electrically connected to the control portion of each of said timing delay semiconductive elements, and each said first diode having an anode portion, a separate resistive element electrically interconnected between said supply potential means and said anode portions, respectively, and a separate second diode having an anode portion respectively electrically connected to said first mentioned anode portion and each said second diode having a cathode portion, a separate clock terminal respectively connected to each said cathode portions of each said second diodes, third current sink resistive means electrically connecting said third current sink to said clock terminal in each of said plurality of integrators and a common electrical connection between said third current sink and all said timing semiconductive element emitter portions.

* * * * *